(12) United States Patent
Bowers et al.

(10) Patent No.: US 7,318,228 B2
(45) Date of Patent: Jan. 8, 2008

(54) SYSTEM AND METHOD FOR TASK ARBITRATION IN MULTI-THREADED SIMULATIONS

(75) Inventors: Heather Bowers, Oakland, CA (US); Tao Huang, Milipitas, CA (US)

(73) Assignee: Broadcom Corporation, Irvine, CA (US)

( * ) Notice: Subject to any disclaimer, the term of this patent is extended or adjusted under 35 U.S.C. 154(b) by 925 days.

(21) Appl. No.: 10/261,740

(22) Filed: Oct. 1, 2002

(65) Prior Publication Data

US 2004/0064814 A1    Apr. 1, 2004

(51) Int. Cl.
G06F 9/46     (2006.01)
G06F 9/44     (2006.01)
G06F 17/50    (2006.01)

(52) U.S. Cl. .............. 718/100; 719/310; 719/313; 717/135; 703/14; 703/22; 712/234

(58) Field of Classification Search ........ 718/100–108; 719/310, 313, 317; 703/14, 22; 717/135; 712/234

See application file for complete search history.

(56) References Cited

U.S. PATENT DOCUMENTS

| | | | | |
|---|---|---|---|---|
| 5,926,635 | A * | 7/1999 | Hsueh et al. | 719/310 |
| 6,272,518 | B1 * | 8/2001 | Blazo et al. | 718/102 |
| 6,457,063 | B1 * | 9/2002 | Chintalapati et al. | 719/317 |
| 6,470,375 | B1 * | 10/2002 | Whitner et al. | 718/105 |
| 6,934,947 | B1 * | 8/2005 | Zeidman | 718/100 |
| 7,035,781 | B1 * | 4/2006 | Flake et al. | 703/14 |
| 2002/0103847 | A1 * | 8/2002 | Potash | 709/107 |
| 2003/0005168 | A1 * | 1/2003 | Leerssen et al. | 709/313 |

OTHER PUBLICATIONS

Freeman E et al.: "JavaSpaces. Principles, Patterns, and Practice" Jun. 15, 1999. Addison Wesley Professional XP002400598.
Lea D: "Concurrent Programming in Java: Design Principles and Patterns" 2nd Edition, Oct. 25, 1999. Addison Wesley Professional, XP002400599.
Schmidt D C et al.: "Comparing Alternative 1-10 Programming Techniques for Multithreaded Corba Servers" C Plus Plus Report, SIGS Publications Inc. New York, NY vol. 8, No. 1, Apr. 1996 pp. 56-66, XP001033506.
Faison T: "Interaction patterns for communicating processes" Pattern Languages of programs conference, Aug. 11, 1998, XP002160754 pp. 18-20.

* cited by examiner

Primary Examiner—Meng-Al T. An
Assistant Examiner—Jennifer N. To
(74) Attorney, Agent, or Firm—McAndrews Held & Malloy Ltd.

(57) ABSTRACT

Present herein is a system and method for arbitration in multi-threaded programming. Task calls are directed to a task wrapper that associates the task call with a particular unique identifier, and stores parameters provided by the task call at memory locations associated with the unique identifier. The execution of the task is handled by a task loop. The task loop queues a plurality of memory portions into a circular queue. The contents of the queue are serially provided to the task, and the results are serially written to the circular queue and provided back to the calling threads.

6 Claims, 5 Drawing Sheets

SYSTEM AND METHOD FOR TASK ARBITRATION IN MULTI-THREADED SIMULATIONS

RELATED APPLICATIONS

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

The present application is directed to simulation systems, and more particularly to a system and method for task arbitration among multiple threads.

BACKGROUND OF THE INVENTION

Simulation programs are frequently used for testing integrated circuits. Integrated circuit production is characterized by high initial costs for the production of the first "copy" followed by low marginal costs for each successive copy. Testing of a design for an integrated circuit prior to production is almost imperative. There are simulation tools provided solely for testing integrated circuit designs.

One of the most popular simulation tools is known as Verilog™. Integrated circuit testing is achieved in Verilog™ through completion of various tasks. Verilog™ tasks are executed by calling the task from a calling statement in a calling thread. After execution of the Verilog™ task, execution is returned to the next statement in the calling thread. In many cases, multi-threaded programming is needed to test multiple features of a design in one simulation run. Multi-threaded programming involves multiple flows of instructions, each of which can include a task call to the same task. Calls to the same task are carried out serially.

One drawback of multi-threaded programming in the Verilog™ context is that there is no way to control serial execution of the same task calls from different threads, due to the concurrent nature of Verilog™. An arbitration scheme must be in place such that any task call from one thread is not be carried out until the previous task call to an identical task is finished.

Although each task call will start a unique procedure process, all the procedure processes from the same task will share the same parameters and local variables. These procedure processes have the potential to collide with each other and produce unexpected and undesired results. Thus, the arbiter must also address these issues.

An existing method for resolving this problem is to put each of the threads in a separate module, wherein each module has its own task. In the foregoing manner, a task call procedure belongs to the module instance where it is declared. Two identical tasks in two different modules will never collide with each other since the tasks do not share any parameters and local variables. Arbitration on the task calls is achieved by control permission on the task calls in the different modules. However, the foregoing is complex. For example, in 32 thread testing, 32 modules need to be created.

Accordingly, it would be beneficial if a simpler scheme for handling conflicts between task calls in multiple threads was provided.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein are a system and method for task arbitration between task calls of multiple threads. A task wrapper receives all calls to a particular task. Responsive to receiving the call for the particular task, the task wrapper assigns a unique identifier to the task call and stores the parameters associated with the task call in memory. Since the task wrapper stores the parameters in different locations each time a task call is received, the tasks do not collide with each other.

A task loop continuously and serially scans a region of memory. As the task loop scans the memory, the task loop retrieves the parameters from the memory and provides the parameters to the task. The task operates on the parameters and returns results to the task loop. The task loop stores the results in memory. The task wrapper retrieves the results from the memory and returns the results to the calling threads.

These and other advantages and novel features of the embodiments in the present application will be more fully understood from the following description and drawings.

DETAILED DESCRIPTION OF THE INVENTION

Figure 1:
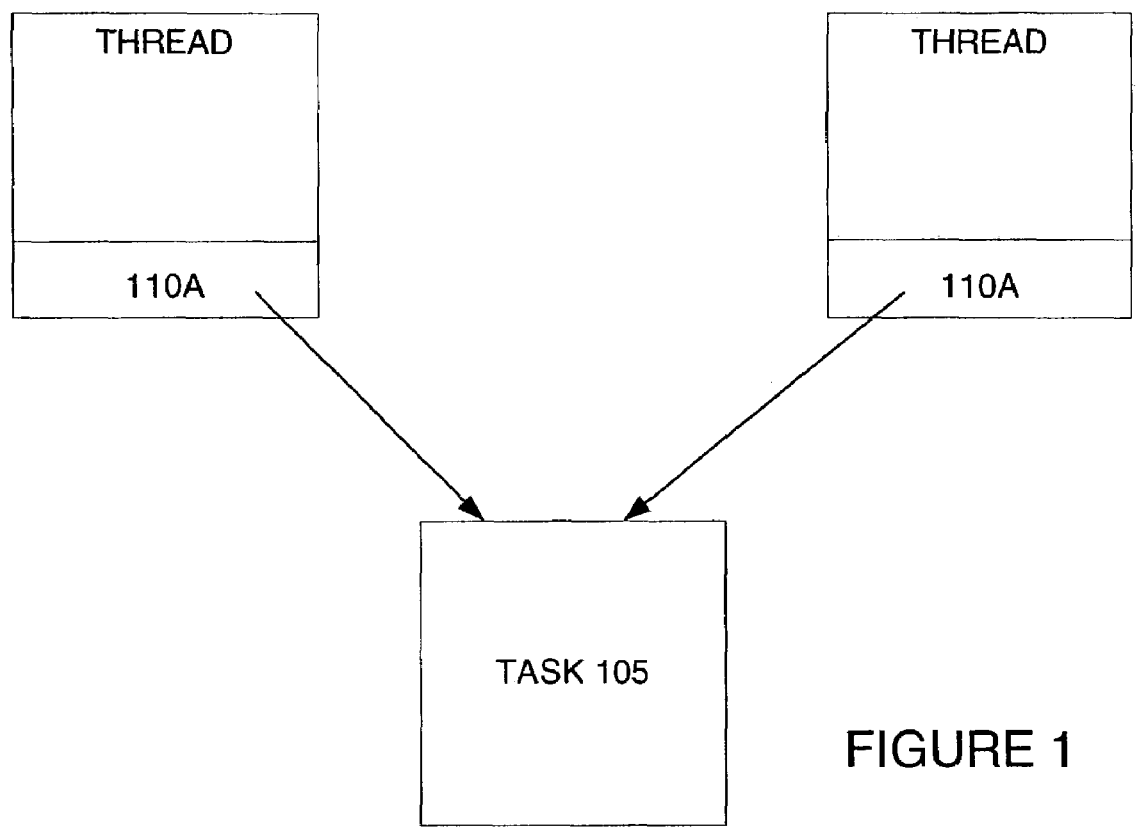
FIG. 1 is a block diagram of an exemplary multi-threaded programming environment wherein the present invention can be practiced.

Referring now to FIG. 1, there is illustrated a block diagram of an exemplary multi-threaded environment wherein the present invention can be practiced. The threads 110 include instructions calling a task 105 known as a task call 110a. The task calls 110a call the task 105 and provide arguments, known as parameters, to the task 105. Responsive thereto, the task 105 operates on the parameters and returns results to the task call 110a. Each of the multiple threads 110 can call the same task 105, by different task calls 110a. The different task calls 10a can provide different parameters to the task 105.

To avoid conflicting calls to the task 105, in accordance with the present invention, an arbitration scheme can be used wherein a task manager receives each task call 110*a*. The task manager schedules the task to operate on the parameters provided by the task calls 110*a* in serial fashion. Additionally, the task manager differentiates the parameters of each task call 110*a*. The foregoing prevents collisions between each of the tasks calls 110*a*.

Figure 2:
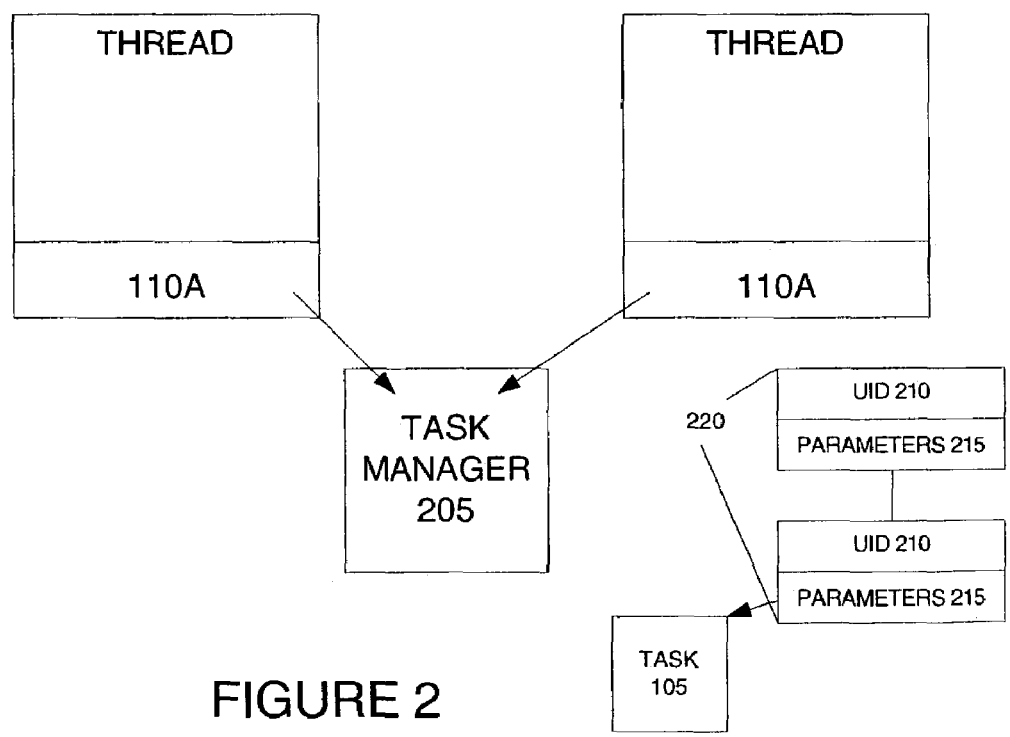
FIG. 2 is a block diagram of an exemplary multi-threaded programming environment configured in accordance with an embodiment of the present invention.

Referring now to FIG. 2, there is illustrated a block diagram of an exemplary multi-threaded environment configured in accordance with an embodiment of the present invention, wherein multiple threads 110 can call a task 105. A task manager 205 is placed between the task 105 and the threads 110 and receives all task calls 110*a*, and parameters associated with the task calls 110*a*. When the task manager 205 receives the task calls 110*a*, the task manager 205 selects and associates a unique identifier identifying and distinguishing each of the task calls 110*a*, and schedules execution of the task 105 for the task call 110*a*.

The execution of the task 105 for each task call 110*a* is scheduled by placement of the unique identifier 210 and the parameters 215 provided by the calling thread 110 in a queue 220. The queue 220 executes the task 105 using the parameters 215 stored therein. When the task 105 is executed using parameters 215 in the queue 220, the unique identifier 210 is used to identify the calling thread 110 and the results are returned to the calling thread 110.

Because each task 105 execution associated with a calling thread 110 uses a different object, e.g., parameters 215 in queue 220, for each task call 110*a* and because the queue 220 causes each task execution to occur serially, the task calls 110*a* do not collide with each other.

Figure 3:
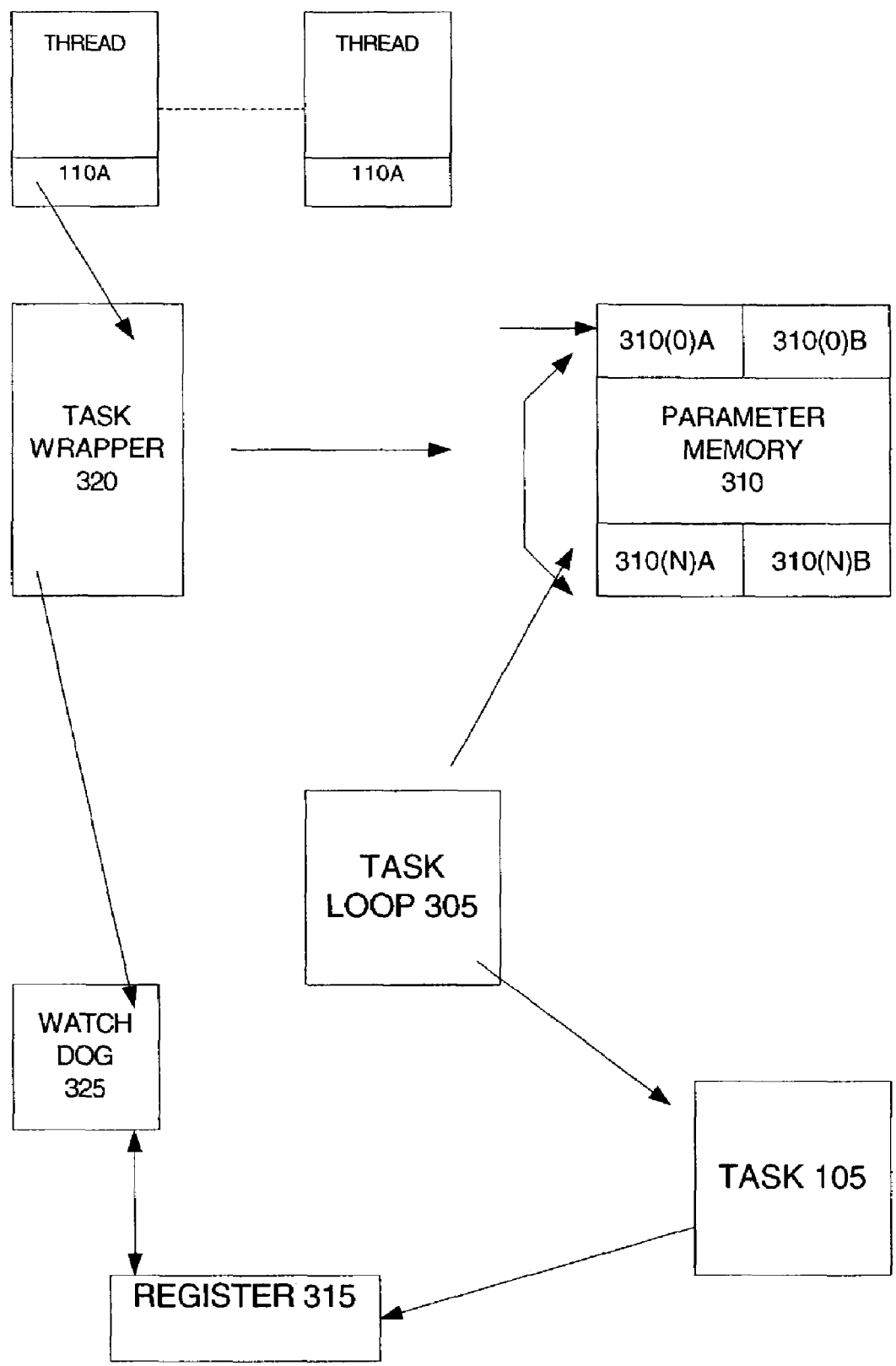
FIG. 3 is a block diagram of multiple threads with task calls to a Verilog™ task configured in accordance with an embodiment of the present invention.

Referring now to FIG. 3, there is illustrated a block diagram of an exemplary multi-threaded Verilog™ simulation wherein the multiple threads 110 include task calls 110*a* to a Verilog™ task 105, configured in accordance with an embodiment of the present invention. The multi-threaded simulation can comprise a simulation of an integrated circuit. Integrated circuit testing is achieved in Verilog™ through completion of various tasks 105. As noted above, multiple threads 110 are used to test interworking parts of an integrated circuit. Execution of the task 105 is controlled by a task loop 305. The task loop 305 is a program which sequentially scans predetermined locations of a parameter memory 310.

The parameter memory 310 stores any number of parameters for the task 105. Contiguous portions 310(0) . . . 310(*n*) of the parameter memory 310 store a complete set of parameters for operation by the task 105 and can store a complete set of results from the operation of the task 105 on the parameters. A first set of memory locations in the parameter memory portions 310(*x*)*a* stores parameters while a second set of memory locations in the parameter memory portions 310(*x*)*b* store results from operation by the task 105 on the parameters. The portions 310(0) . . . 310(*n*) of the parameter memory 310 are also associated with a unique identifier. The parameter memory 310 serves as a circular queue of parameters for operation by the task 105.

As the task loop 305 scans each portion of the parameter memory 310(0) . . . 310(*n*), the parameters are retrieved from the parameter memory portion 310(*x*)(*a*) and provided to the task 105. The task operates on the parameters 105 and provides any result data to the task loop 305. The task loop 305 stores the results of operation of the task on the parameters retrieved from parameter memory portion 310(*x*)*a* in parameter memory portion 310(*x*)*b*.

Also included is a register 315 comprising a plurality of bits, wherein each bit 315(0) . . . 315(*n*) of the register 315 is associated with a particular one of the unique identifiers. A register bit 315(*x*) is set each time that the task 105 writes results to the parameter memory portion 310(*x*)*b* associated with the same unique number.

Figure 4:
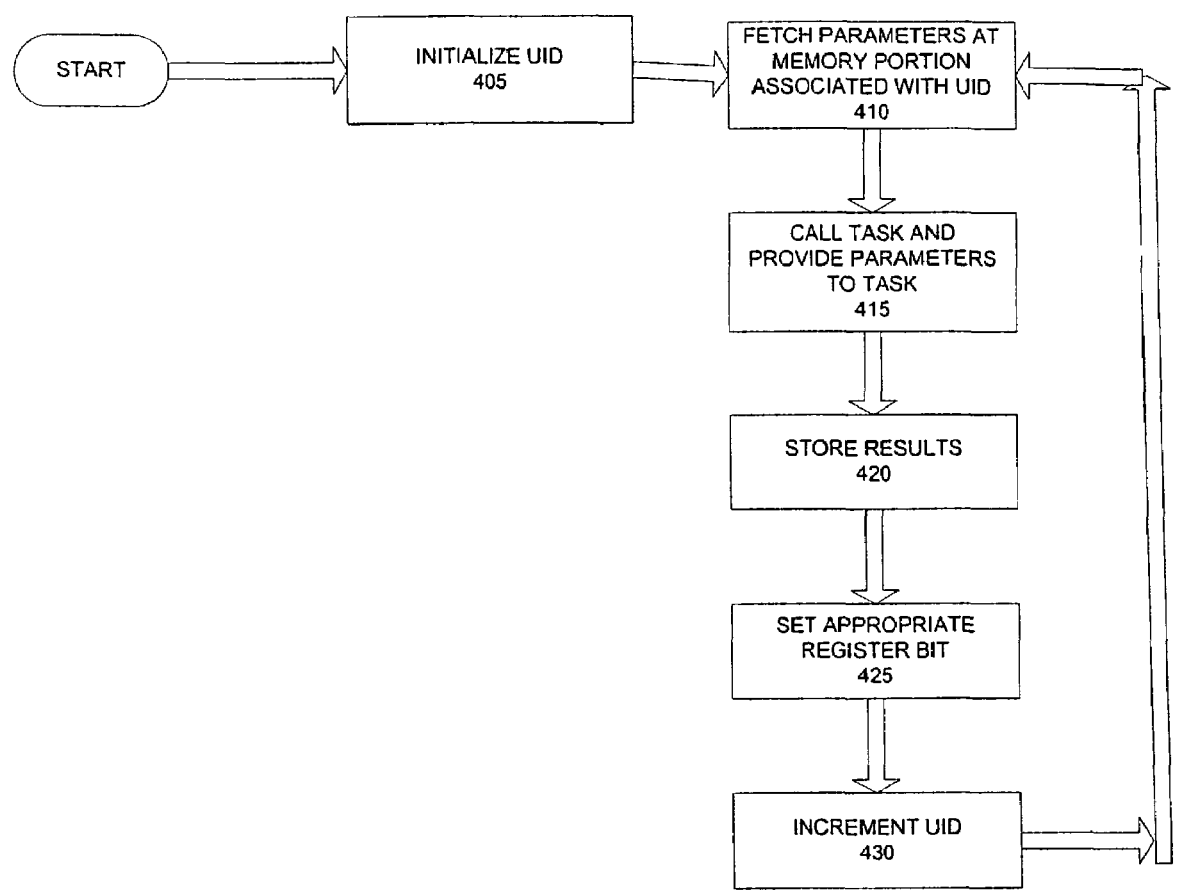
FIG. 4 is a flow diagram describing the operation of the task loop in accordance with an embodiment of the invention.

Referring now to FIG. 4, there is illustrated a flow diagram describing an exemplary operation of the task loop 305. At 405, a unique identification counter is initialized to zero. At 410, the task loop 305 fetches parameters for the task 105 from a parameter memory portion 310(*x*)*a* associated with the unique identification stored in the unique identification counter. After fetching the parameters, the task loop 305 causes the task 105 to be called with a task call (415). Upon completion of the task 105, results from the task call are stored (420) in the parameter memory portion 310(*x*)*b* associated with the unique identifier stored in the unique identifier counter.

At 425, the register bit 315(*x*) associated with the unique identifier stored in the unique identifier counter is set. At 430, the unique identifier counter is incremented to reference the next parameter memory portion 310(*x*) in circular sequence. It is noted that the parameter memory 310 actually serves as a circular queue, wherein parameter memory portion 310(0) follows parameter memory portion 310(*n*). After incrementing the unique identifier counter, 410-430 are repeated by the task loop 305 for the parameters stored in the parameter memory portion 310(*x*+1), associated with incremented unique identifier counter.

Referring again to FIG. 3, the plurality of threads 110 direct task calls 110(*a*) to a task wrapper 320. The task wrapper 320 selects a unique identifier for the task call 110(*a*) and stores the parameters at the parameter memory portion 310(*x*) associated with the unique identifier for the task call 310(*x*). Additionally, the task wrapper 320 resets the register bit 315(*x*) associated with the unique identifier. The selection of the unique identifier can be made by use of another counter that is incremented as each unique identifier is associated with a particular task call 110(*a*). The unique identifier, however, corresponds to the unique identifiers of the parameter memory portions 310(*x*). After setting the register bit 310(*x*), the task wrapper 320 launches a watchdog 325 associated with the register bit 315(*x*). The watchdog 325 polls the register bit 310(*x*) for a set bit condition.

When the task loop 305 fetches parameter memory portion 310(*x*)*a* the task 105 will be called to operate on the parameters stored therein and the results of the operation will be stored in parameter memory portion 310(*x*)*b*, as described in FIG. 4 at 410 for example. After operation of the task 105 on the parameters, the task wrapper sets the register bit 310(*x*) at 425.

When the watchdog 325 detects the set bit condition, the watchdog 325 notifies the calling task wrapper 320. The task wrapper 320 can then retrieve the results from parameter memory portion 310(*x*)*b*, and return the results to the calling statement 110*a*.

Figure 5:
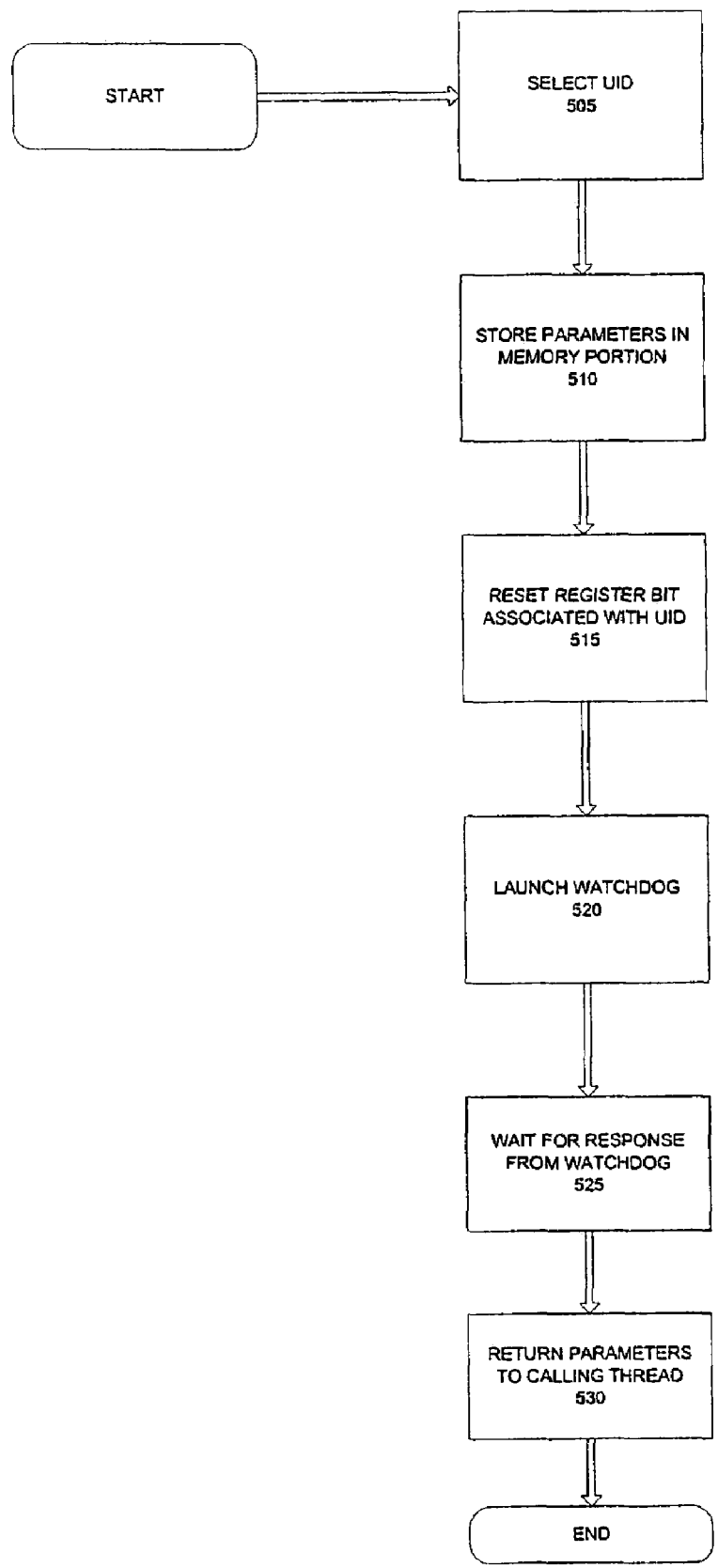
FIG. 5 is a flow diagram describing the operation of the task wrapper 220 in accordance with an embodiment of the invention.

Referring now to FIG. 5, there is illustrated a flow diagram describing an exemplary operation of the task wrapper 320 responsive to receipt of a task call 110(*a*) from a calling thread 110. At 505, the task wrapper 320 selects a unique identifier for the task call 110*a*. The parameters provided by the task call 110*a* upon which the task 105 is to operate are stored (510) in parameter memory portion 310(*x*)*a* associated with the selected unique identifier. At 515, the register bit 315(*x*) associated with the unique identifier is reset and a watchdog 325 for the register bit 315(*x*) is launched (520). At 525, the task wrapper 320 waits for the watchdog 325 to indicate that the task 105 has operated on the parameters at parameter memory portion 310(*x*)*a*. Responsive thereto, the task wrapper 320 returns (530) the results stored in parameter memory portion 310(*x*)*b* to the calling thread 110.

Figure 6:
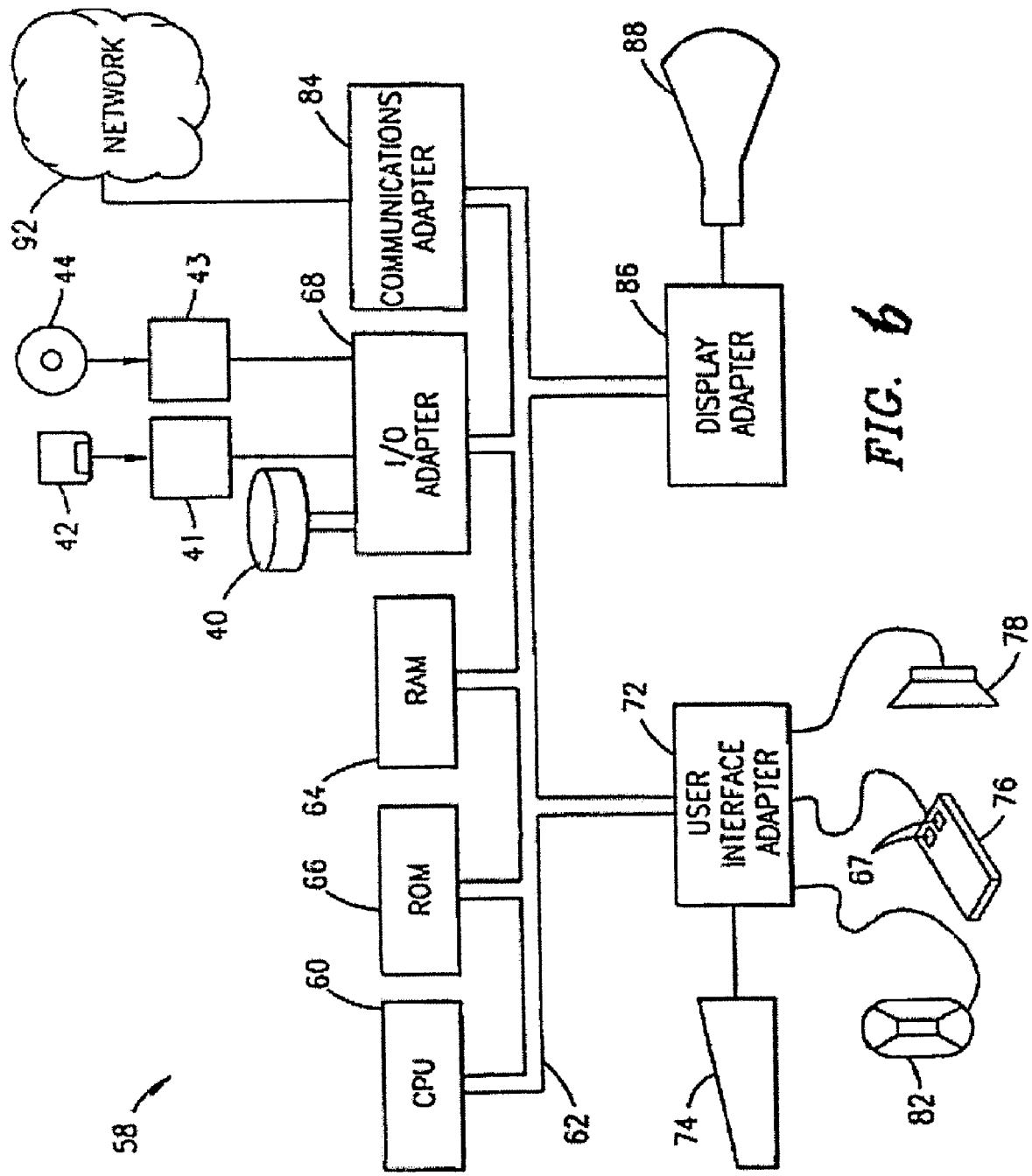
FIG. 6 is an exemplary hardware environment wherein the present invention can be practiced.

Referring now to FIG. 6, there is illustrated an exemplary computer system 110 in accordance with an embodiment of the present invention. A CPU 60 is interconnected via system bus 62 to random access memory (RAM) 64, read only memory (ROM) 66, an input/output (I/O) adapter 68, a user interface adapter 72, a communications adapter 84, and a display adapter 86. The input/output (I/O) adapter 68 connects peripheral devices such as hard disc drives 40, floppy disc drives 41 for reading removable floppy discs 42, and optical disc drives 43 for reading removable optical disc 44 (such as a compact disc or a digital versatile disc) to the bus 62. The user interface adapter 72 connects devices such as a keyboard 74, a mouse 76 having a plurality of buttons 67, a speaker 78, a microphone 82, and/or other user interfaces devices such as a touch screen device (not shown) to the bus 62. The communications adapter 84 connects the computer system to a data processing network 92. The display adapter 86 connects a monitor 88 to the bus 62.

An embodiment of the present invention can be implemented as sets of instructions resident in the random access memory 64 of one or more computer systems 110 configured generally as described in FIG. 5. Until required by the computer system 58, the set of instructions may be stored in another computer readable memory, for example in a hard disc drive 40, or in removable memory such as an optical disc 44 for eventual use in an optical disc drive 43, or a floppy disc 42 for eventual use in a floppy disc drive 41. The physical storage of the sets of instructions physically changes the medium upon which it is stored electrically, magnetically, or chemically so that the medium carries computer readable information.

The foregoing allows for concurrent execution of tasks, such as Verilog™ tasks, while avoiding collisions between different calls to a particular task. Additionally, because the configurations are made at the task level, modifications are not required to the calling threads. The foregoing simplifies adaptation of preexisting simulations.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for executing a first task, said system comprising:
   a first plurality of memory locations for storing a plurality of parameter sets for operation upon by the first task;
   a second plurality of memory locations for storing a second task, wherein the second task calls the first task a plurality of times and provides a different one of the plurality of parameter sets to the first task during each of the plurality of times;
   a register comprising a plurality of bits, wherein each of said bits corresponds to a different one of the plurality of parameter sets; and
   an output memory for storing results of the operation performed by the first task;
   wherein the second task sets a particular one of the plurality of bits associated with a particular one of the plurality of parameters sets after providing the particular one of the parameter sets to the first task.

2. The system of claim 1, further comprising:
   a third plurality of memory locations for storing a plurality of threads, wherein the plurality of threads includes a calling statement and a certain parameter set.

3. The system of claim 2, further comprising:
   a fourth plurality of memory locations for storing a third task, wherein the third task receives the parameters from at least one of the plurality of threads and stores the parameters in the first plurality of memory locations.

4. The system of claim 3, wherein the third task launches a fourth task, wherein the fourth task polls a particular one of the register bits.

5. The system of claim 4, wherein the second task receives results from the first task and sets the particular one of the register bits.

6. The system of claim 5, wherein the fourth task detects setting of the particular one of the register bits and wherein the third task provides results to a particular one of the threads.

\* \* \* \* \*